United States Patent [19]
Zimmer

[11] Patent Number: 5,336,843
[45] Date of Patent: Aug. 9, 1994

[54] PROCESS FOR COMPACTING NORMALLY OCCURRING RADIOACTIVE MATERIAL (NORM) IN SEALED TUBULAR MEMBERS

[76] Inventor: John Zimmer, 4308 W. Admiral Doyle Dr., New Iberia, La. 70560

[21] Appl. No.: 986,277

[22] Filed: Dec. 7, 1992

[51] Int. Cl.$^5$ .............................................. B09B 1/00
[52] U.S. Cl. ............................. 588/249; 100/37; 100/249; 405/128
[58] Field of Search ............... 588/249; 405/128, 129; 100/249, 229 A, 37

[56] References Cited

U.S. PATENT DOCUMENTS

| | | | |
|---|---|---|---|
| 3,828,663 | 8/1974 | Poplinski | 100/249 X |
| 4,036,359 | 7/1977 | Strickland | 100/37 X |
| 4,040,230 | 8/1977 | Pessel et al. | 100/249 X |
| 4,389,928 | 6/1983 | Burgin | 100/37 |
| 4,590,000 | 5/1986 | Baatz et al. | 100/249 X |
| 4,646,633 | 3/1987 | Falguieres | 100/37 |
| 4,877,353 | 10/1989 | Wisotsky | 405/129 X |
| 5,043,103 | 8/1991 | Manchak et al. | 405/129 X |

FOREIGN PATENT DOCUMENTS 2253468  7/1975  France ............................. 100/37

*Primary Examiner*—Dennis L. Taylor
*Attorney, Agent, or Firm*—Pravel, Hewitt, Kimball & Krieger

[57] ABSTRACT

A process for compacting normally occurring radioactive material (NORM) into a cylinder, such as a pipe, by providing a cylinder having a continuous sidewall, a first open end and a second closed in, and a cavity formed by the side wall defining a NORM storage space therein; providing a hopper for holding a quantity of the NORM; positioning the open end of the cylinder against the hopper, so that there is communication between the hopper space containing the NORM and the cylinder space; moving a ram member through the hopper toward the open end of the cylinder for forcing a quantity of the NORM contained within the hopper into the cylinder; repeating the compaction step until the cylinder is substantially filled with the NORM; and closing off the open end of the cylinder so that the NORM cannot move from the cylinder. The process also includes the step of removing the moisture from the NORM before the NORM is compacted in the cylinder.

20 Claims, 3 Drawing Sheets

PROCESS FOR COMPACTING NORMALLY OCCURRING RADIOACTIVE MATERIAL (NORM) IN SEALED TUBULAR MEMBERS

BACKGROUND OF THE INVENTION

1. Field Of The Invention

The present invention relates to compacting waste materials. More particularly, the present invention relates to a method of compacting normally occurring radioactive material (NORM) in tubular members, such as oilfield drill pipe or casing, sealing the compacted NORM, and storing the material downhole to prevent contamination.

2. General Background

In general, normally occurring radioactive material, hereinafter referred to as NORM, represents soil sealer or rock material which has become somewhat radioactive from its being located beneath the surface of the earth. However, oftentimes, this NORM works its way to the surface and may present RAD levels above 25 RADs, which is the lowest acceptable level. However, some areas or states require that any NORM on the surface above, for example, 25 RADs, must be removed and either decontaminated or stored away to avoid contamination.

For example, recently the State of Louisiana imposed regulations which requires that all NORM 25 RADs above existing PAD level, which is 0, must be removed from the surface and disposed of safely. Moreover, due to the heavy activity in downhole drilling in Louisiana, cuttings from the drilled wells are brought to the surface, and oftentimes the sand and shale brought up are retrieved from a "hot" formation, and therefore the equipment, likewise, becomes hot and must be cleaned. The hot NORM is then dumped on the ground, and during the past some thirty years of this activity, a great quantity of NORM must be picked up and disposed of under the new regulations.

There have been attempts to clean up the NORM in several methods. One method has been to produce a slurry with the NORM and to pump the NORM slurry into a depleted production formation. However, this method has had limited success, since the volume is greatly increased by the addition of the water.

Other objects of the invention will be obvious to those skilled in the art from the following description of the invention.

SUMMARY OF THE PRESENT INVENTION

The process and system of the present invention solves the problems in the art in a simple and straightforward manner. What is provided is a process for compacting normally occurring radioactive material (NORM) into a cylinder, such as a pipe, by providing a cylinder having a continuous sidewall, a first open end and a second closed in, and a cavity formed by the side wall defining a NORM storage space therein; providing a hopper for holding a quantity of the NORM; positioning the open end of the cylinder against the hopper, so that there is communication between the hopper space containing the NORM and the cylinder space; moving a ram member through the hopper toward the open end of the cylinder for forcing a quantity of the NORM contained within the hopper into the cylinder until the cylinder is substantially filled with the NORM; and closing off the open end of the cylinder so that the NORM cannot move from the cylinder. The apparatus for undertaking the process, as described above, also constitutes a portion of the patentable subject matter.

Therefore, it is a principal object of the present invention to provide a process for storing NORM in a safe place in a sealed container which will remain contamination free.

It is a further object of the present invention to utilize tubular members, such as oilfield pipe or casing, where NORM can be safely stored downhole for an indefinite amount of time;

It is a further object of the present invention to provide a process for storing NORM in a tubular member which allows a greater volume of NORM to be compacted in the member and to be sealed in a safe, contamination-free environment below the earth surface, to produce compaction from 50% to 400%.

It is a further object of the present invention to provide a process for storing NORM in a tubular member including the steps of removing a substantial portion of the moisture contained in the NORM, discharging the removed moisture, and then compacting the moisture-free NORM in the tubular member for storage.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
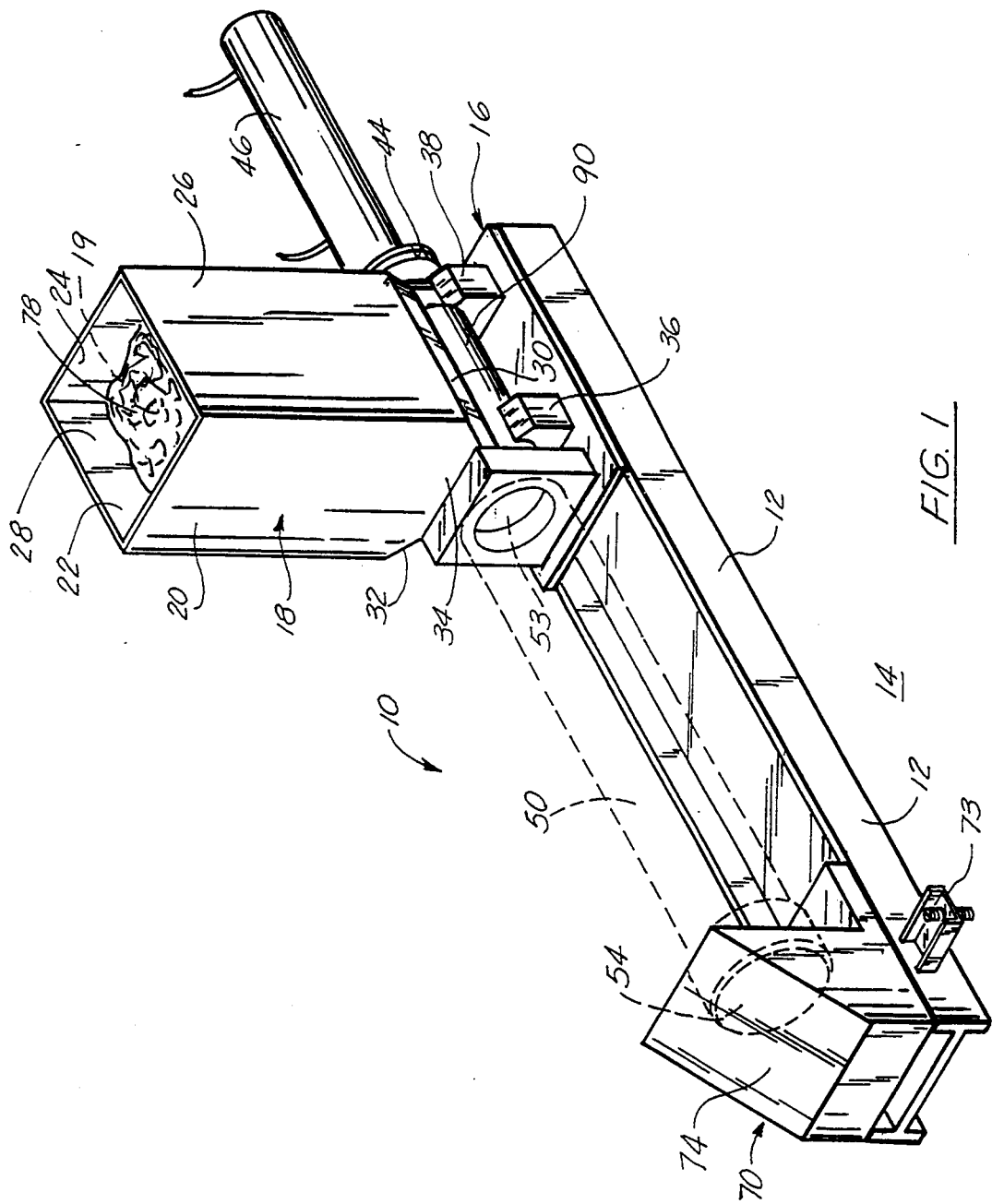
FIG. 1 illustrates an overall view of the preferred embodiment of the apparatus for carrying out the method of the present invention.
Figure 2:
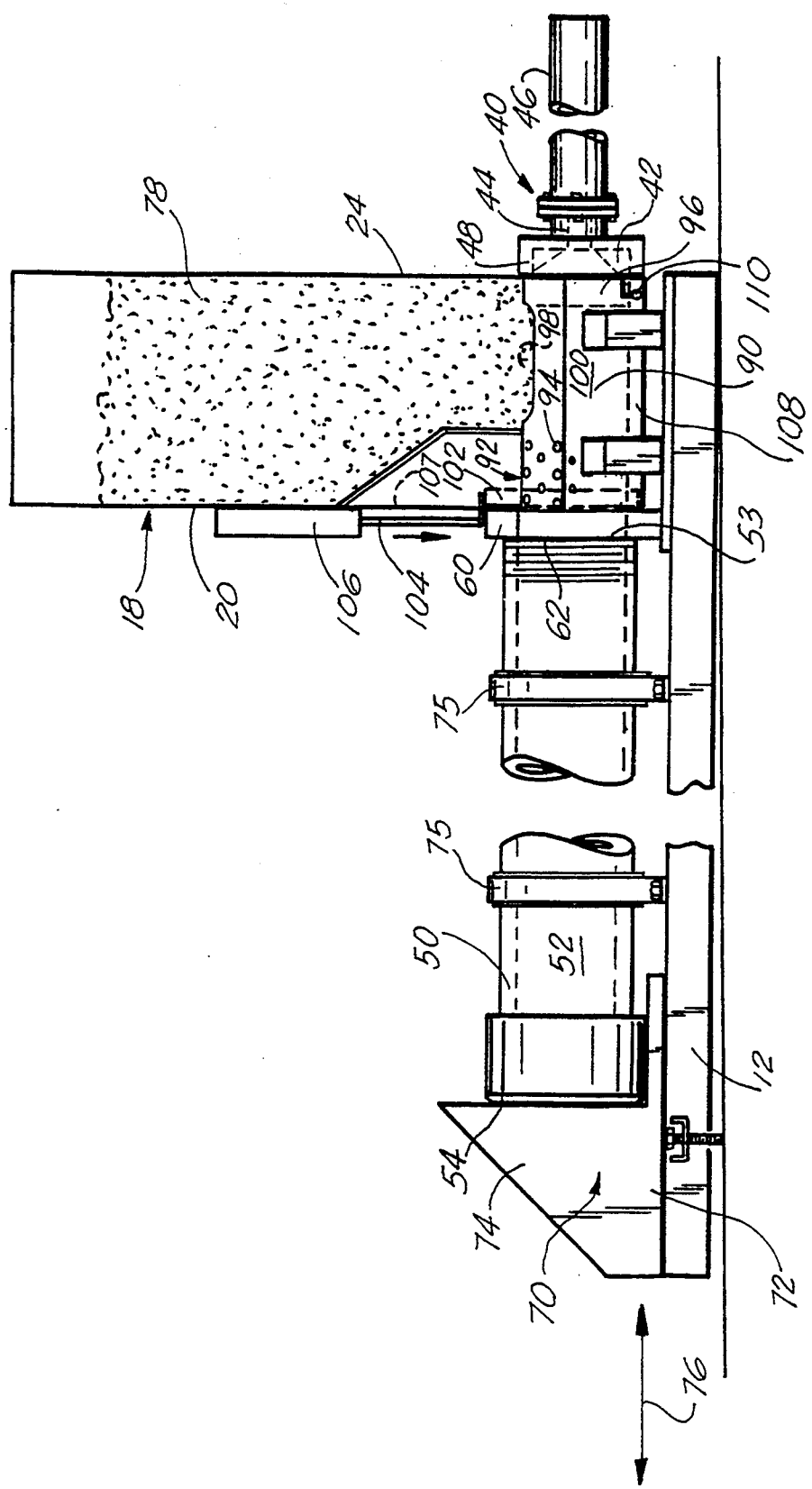
FIG. 2 illustrates a side view of the preferred embodiment of the apparatus.
Figure 3:
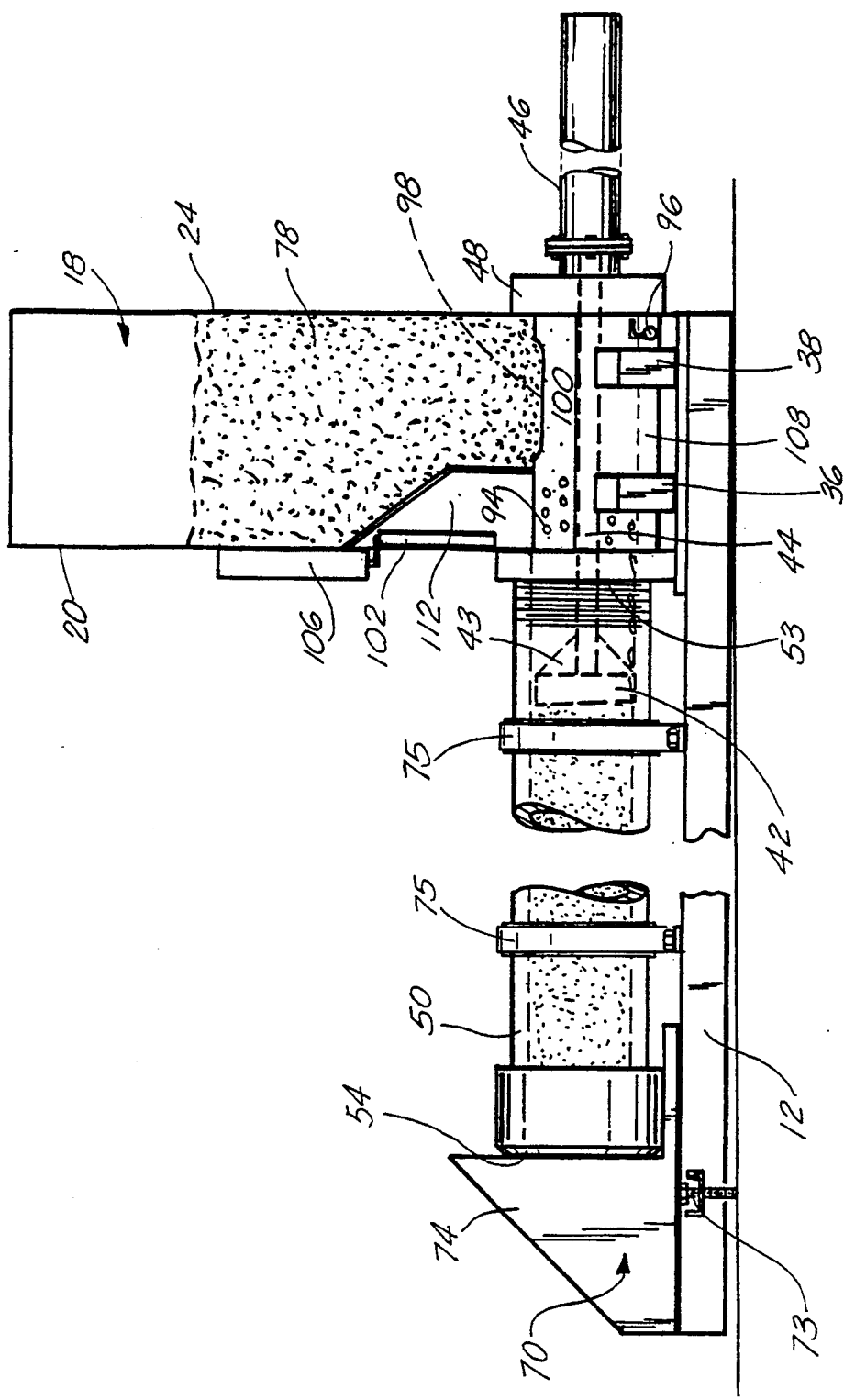
FIG. 3 illustrates a side view of the preferred embodiment of the apparatus during the compaction process of NORM.

The preferred embodiment of the apparatus for carrying out the process of the present invention is illustrated in FIGS. 1-3 by the numeral 10. As illustrated in overall view in FIG. 1, apparatus 10 would comprise an overall elongated skid portion 12, for being positioned on a surface 14, such as the floor or the like. Skid 12 would support on its first end 16, a hopper 18, comprising four upright walls 20, 22, 24, 26, an open upper end 28, all defining a hopper storage space 19 therein. There is further provided a pair of inwardly depending lower walls 30, 32 terminating in a lower container portion 34, of a particular diameter, as will be discussed further.

As illustrated, the hopper 18 is positioned on a pair of base supports 36, 38, upon skid 12. As seen more clearly in FIGS. 2 and 3, on the rear wall 24 of hopper 18, there is provided a ram means 40, having a ram member 42, positioned at the end of a drive shaft 44, housed within an elongated housing 46, extending from wall 24 of hopper 18. As is illustrated, the ram member 42 may be partially positioned within a chamber 48, outside of hopper 18, but in communication with the interior 19 of hopper 18. During the process of the present invention, the drive shaft 44 would be driven via hydraulic power or the like, moving the ram member 42 through the lower portion 34 of hopper 18, as previously described, with the outside diameter of ram 42 being slightly less than the inside diameter of the lower portion 34 of hopper 18.

On the forward wall 20 of hopper 18 there would be provided a means to secure the open end of a tubular member 50, to the hopper 18. Preferably, member 50 would be of a length generally of 10 to 40 feet, and depending whether it is a section of drill pipe or production casing, or other oilfield tubular member, would be of varying diameters. Also, member 50 would have a continuous annular sidewall 52, with a first open end 53 positioned in the securing means, and a second closed end 54, which could be capped or welded closed before being positioned adjacent hopper 18.

Returning to the securing means, there would be provided an adjustable clamp 60, having an adjustable opening 62, so that once the open end 53 of tubular member 50 is positioned therein, as seen in FIG. 3, the opening is tightened around the end 53 of member 50, so as to prevent any leaking of NORM from around the end of member 50.

At the second end of skid 18, there is provided a means for securing the closed end 54 of member 50 in place, to allow member 50 to rest secured and substantially parallel to the surface 14. This means comprises a backstop member 70, having a base portion 72 positioned on the skid 12, and an upright portion 74 for housing the closed end of the member 50 as seen in FIG. 1. In view of the fact that both the open end 52 must be positioned within the clamp 60 secured to hopper 18, and the closed end 54 of tubular member 50 must each be positioned within the backstop member 70, backstop member 70 has the ability to move rearward and forward, in the direction of arrows 76, so as to allow clearance for tubular member 50 to be set in position as seen in FIG. 1, and then to be moved forward into position housing the closed end of member 50, and clamped in place. There is further provided at least two wrap around clamps 75 positioned along the length of member 50 in order to prevent any sagging or deformation during compaction in member 50 when secured onto the skid 12.

One of the additional inventive features of the present invention is the inclusion of a means to remove the moisture which would normally be present in most NORM prior to compacting it in the tubular member. As illustrated in the figures, this means comprises first a tubular member 90 positioned in the hopper 18 at the level of the ram member 42, which allows the ram member 42 to retract into the member 90 during retrieval out of the tubular member 50. As illustrated the member 90 would have a first portion 92 further comprising a plurality of bores 94 in its wall, for allowing the escape of moisture, as will be explained. There is included a second portion 96 extending to the rear wall 26 of the hopper. This portion 96 has an open top portion 98 for allowing the NORM 78 contained in hopper 18 to fall into the space 100 within tubular member 90 which the compaction member 42 has been retrieved to the rear of the hopper. When the NORM is ready to be compacted, there is provided a barrier 102 lowered into position blocking the entrance to tubular member 50, along the inner face of front wall 20 of the hopper 18. This barrier is connected to a hydraulic ram 104, operated via a hydraulic cylinder 106, positioned outside of the hopper 18, with the ram connected to the barrier 102 via a slot 107 in the wall 20 of hopper 18 to allow upward and downward movement as the case may be. As seen in FIG. 3, with the barrier 102 in the lower position, the ram 42 then would move within tubular member 90, compacting the NORM 78 against the barrier 102, within first portion 92 of member 90. As the NORM 78 is compacted against barrier 102 most of the moisture is forced from the NORM and out of the plurality of bores 94 to drain to the lower drainage portion 108 of the hopper 18. The fluid or water collected here is then released to the outside via a discharge valve 110.

Following the compaction of the NORM to release water, the barrier 92 is raised to the up position allowing access of the NORM into the tubular member 50 (FIG. 3). The ram 42 is moved forward, and pushes the compacted NORM into the member 50 with great force reducing the volume significantly and the process is repeated until the tubular member 50 is filled with NORM free of moisture which allows for tighter compaction.

In order to maintain the NORM to be compacted within hopper 18 apart from the first portion 92 of member 90, there is provided a divider wall 112, extending from the upper portion of hopper 18, to a point adjacent the end of first portion 92, so that no NORM may make contact with the bores 94 from the outside of member 90 which would block flow of moisture from bores 94 during the moisture removal process.

Another feature of the system not previously discussed is an additional means for assuring that most water contained within the NORM, not removed by the compression step, is allowed to drain off during the compaction process. As seen in FIG. 3, which illustrates the ram 42 compacting the NORM within member 50, the end of skid 12 where the backstop 70 is positioned is inclined slightly via a screw 73. This allows that any fluid trapped within the NORM during compaction would flow, through gravity, toward the open end of the member 50, and would not be maintained within the compacted NORM. Of course, the fluid would drain past the ram 42, since the outside diameter of ram 42 is less than the inside diameter of member 50, thereby provided a fluid drain space therebetween.

For purposes of construction, it is foreseen that hopper 18 could be as much as 10 feet across, thus providing that ram 42 travel within the hopper space a distance. Since ram 42 would be supported on by the shaft 44, there may be a tendency for ram 42 to drop a bit during its travel through the hopper space, and not be fully aligned with the opening of pipe member 50. To prevent this, there may be provided a pair of guide bars extending across the width of hopper 18, between walls 20 and 24, so that ram 42 would essentially travel along these bars and maintain a straight path.

In addition, as seen in FIG. 3, following the travel of ram 42 into the space 100, the ram 42 would be withdrawn to allow it to push more NORM 78 into the member. However, as it is withdrawn, it is foreseen that the back face 43 of ram 42 may encounter NORM 78 in its return trip and be prevented from returning across the width of hopper 18. Therefore, it may be that the ram 42 may include a conically-shaped rear face extending from its side wall 45, which would prevent any NORM 78 from occupying the space following the passage of the ram 42 across hopper 18.

METHOD OF THE INVENTION

Overall, in summary, the process for compacting normally occurring radioactive material (NORM) 78 into a tubular member 50, such as a pipe, would provide a cylinder having a continuous sidewall, such as a length of oilfield tubing, with a first open end 52 and a second closed end 54, and a space formed by the side wall defining a NORM storage space therein. There would then be provided a hopper 18 for holding a quantity of the NORM 78. The tubular member 50 would be positioned with the open end of the cylinder against the hopper 18, so that there is communication between the hopper space 19 containing the NORM 78 and the tubular member space.

Prior to the compaction of the NORM into the member 50, a barrier wall 102 would be lowered blocking the entrance into member 50. The ram 42 would then be moved forward within a cylinder in hopper 18, compressing the NORM between the face of the ram and the barrier wall, thus forcing moisture from the NORM within the cylinder 92. The wall of member 92 would include a plurality of bores 94 for allowing the moisture to flow from the compressed NORM into the lower drainage portion of the hopper, to be discharged by a valve means.

The barrier wall would then be raised by a hydraulic cylinder, allowing communication between the hopper and the storage member 50. The ram 42 would then be moved toward the open end of the member 50 for forcing a quantity of the NORM 78, substantially free of moisture, into the tubular member 50. These steps would be repeated until the tubular member 50 is substantially filled with the moisture-free NORM 78. The tubular member 50 would then be closed off at the open end 52 so that the NORM 78 cannot escape from the member 50. There would also be provided a means to lift an end of the pipe, so that water trapped in the NORM can drain off during compaction, and the system could accommodate various lengths and widths of tubular members by adjusting the length of the skid, and by changing the size of the ram utilized during compaction.

| Glossary of Terms | |
| --- | --- |
| apparatus | 10 |
| skid portion | 12 |
| surface | 14 |
| first end | 16 |
| hopper | 18 |
| storage space | 19 |
| side walls | 20, 22, 24, 26 |
| upper end | 28 |
| lower walls | 30, 32 |
| lower container portion | 34 |
| base supports | 36, 38 |
| ram means | 40 |
| ram member | 42 |
| back face | 43 |
| side wall | 45 |
| drive shaft | 44 |
| elongated housing | 46 |
| chamber | 48 |
| tubular member | 50 |
| sidewall | 52 |
| first open end | 53 |
| second closed end | 54 |
| backstop member | 70 |
| base portion | 72 |
| screw | 73 |
| upright portion | 74 |
| wrap around clamp | 75 |
| arrows | 76 |
| NORM | 78 |
| tubular member | 90 |
| first portion | 92 |
| bores | 94 |
| second portion | 96 |

| -continued | |
| --- | --- |
| Glossary of Terms | |
| open top portion | 98 |
| space | 100 |
| barrier | 102 |
| ram | 104 |
| hydraulic cylinder | 106 |
| slot | 107 |
| drainage portion | 108 |
| discharge valve | 110 |
| divider wall | 112 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for compacting normally occurring radioactive material (NORM) into a cylinder, such as a pipe, comprising the following steps:
  a. providing a cylinder having a continuous sidewall, a first open end and a second closed end, and a cavity formed by the side wall defining a NORM storage space therein;
  b. providing a hopper for holding a quantity of the NORM;
  c. positioning the open end of the cylinder against the hopper, so that there is communication between the hopper space containing the NORM and the cylinder space so that no NORM can escape between the hopper space and the cylinder space during the compaction process;
  d. moving a ram member through the hopper into the open end of the cylinder for forcing a quantity of the NORM contained within the hopper into the cylinder as the ram member moves through the cylinder;
  e. repeating step d until the cylinder is substantially filled with the NORM; and
  f. closing off the open end of the cylinder so that the NORM cannot move from the cylinder by welding the end cap.

2. The process in claim 1, further comprising the step of removing the moisture from the NORM before it is compacted into the tubular member.

3. The process in claim 1, further comprising the step of positioning the cylinder against the wall of the hopper with a moveable backstop.

4. The process in claim 1, further comprising the step of lifting the closed end of the cylinder during compaction so that any fluid contained in the NORM drains back into the hopper.

5. The process in claim 1, further comprising the step of supporting the cylinder with a pair of I-beams or the like running the length of the cylinder.

6. The process in claim 1, wherein the cylinder comprises a length of drill pipe or drill casing or industrial pipe.

7. The process in claim 1, wherein the opened end of the cylinder is clamped in place against the wall of the hopper.

8. The process in claim 1 wherein the hopper space is substantially larger than the diameter of the pipe member.

9. A process for compacting normally occurring radioactive material (NORM) into a length of oilfield tubing, such as drill pipe or casing, the process comprising the following steps:
   a. providing a length of tubing having a continuous sidewall, a first open end and a second closed end, and a cavity formed by the side wall defining a NORM storage space therein;
   b. providing a hopper for holding a quantity of the NORM;
   c. positioning the open end of the tubing against a wall of the hopper, so that there is communication between the hopper space containing the NORM and the cylinder space;
   d. interconnecting the open end of the tubing to the hopper wall so that any NORM moved from the hopper space, moves into the open end of the tubing, and cannot escape to the outside of the tubing;
   e. moving a ram member through the hopper into the open end of the cylinder for forcing a quantity of the NORM contained within the hopper into the cylinder;
   f. repeating step (e) until the cylinder is substantially filled with the NORM; and
   g. closing off the open end of the cylinder so that the NORM cannot move from the cylinder.

10. The process in claim 9, further comprising the step of removing the moisture from the NORM before it is compacted into the tubular member.

11. The process in claim 9, further comprising the step of positioning the cylinder against the wall of the hopper with a moveable backstop.

12. The process in claim 9, further comprising the step of lifting the closed end of the cylinder during compaction so that any fluid contained in the NORM drains back into the hopper.

13. A system for compacting NORM in a tubular member, comprising:
   a. a base component;
   b. a hopper positioned on the base for housing a quantity of NORM;
   c. means on the hopper for securing an open end of a tubular member against the wall of the hopper and in communication with the hopper space;
   d. support means for securing the second, closed end of the tubular member;
   e. ram means for moving a quantity of NORM from the hopper space through the open end of and into the tubular member until the tubular member is substantially filled with compacted NORM; and
   f. means for allowing fluid contained within the NORM to drain out of the tubular member during compaction.

14. The system in claim 13, wherein the means for securing the open end of the tubular member comprises an adjustable clamp member.

15. The system in claim 13, wherein the means for supporting the second closed end of the tubular member comprises a backstop adjustable rearward and forward for accommodating various lengths of tubular members.

16. The system in claim 13, wherein the hopper further comprises a lower portion slightly larger than the width of the ram, so that the NORM in the lower portion is pushed by the ram into the tubular member.

17. The system in claim 13, wherein the tubular member is sealed following the compaction of the NORM therein.

18. In a process for compacting NORM within a tubular member by forcing the NORM from a hopper into the cylinder member, the process comprising the steps of removing moisture from the NORM before compaction, comprising the steps of:
   a. positioning moisture-laden NORM in a cylinder within the hopper between the ram and a barrier wall;
   b. moving the ram within the cylinder and compressing the moisture-laden NORM against the barrier wall within the cylinder;
   c. draining off the moisture through bores in the wall of the cylinder to a drainage area for removal; and
   d. removing the barrier wall, allowing moisture-free NORM access to the tubular member for compaction thereunto.

19. The process in claim 18, wherein the barrier wall is moved between a first up position to a second down position be a hydraulic cylinder.

20. The process in claim 18, wherein a portion of the cylinder in the hopper is open at its top portion to allow NORM to enter for compressing against the barrier wall.

* * * * *